(12) United States Patent
Kweon et al.

(10) Patent No.: US 6,774,958 B2
(45) Date of Patent: Aug. 10, 2004

(54) LIQUID CRYSTAL PANEL, APPARATUS FOR INSPECTING THE SAME, AND METHOD OF FABRICATING LIQUID CRYSTAL DISPLAY THEREOF

(75) Inventors: Hyug Jin Kweon, Kumi-shi (KR); Hae Joon Son, Chilgok-gun (KR); Wan Soo Kim, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 126 days.

(21) Appl. No.: 10/184,103

(22) Filed: Jun. 28, 2002

(65) Prior Publication Data

US 2003/0160907 A1 Aug. 28, 2003

(30) Foreign Application Priority Data

Feb. 26, 2002 (KR) .................................... P 2002-10197
Mar. 13, 2002 (KR) .................................... P 2002-13527

(51) Int. Cl.[7] ...................... G02F 1/1368; G02F 1/1345
(52) U.S. Cl. ........................ 349/40; 349/139; 349/149
(58) Field of Search ............................. 349/40, 42, 54, 349/139, 143, 149, 152; 345/92; 324/770; 257/59, 72; 361/58, 91

(56) References Cited

U.S. PATENT DOCUMENTS

| 3,978,580 A | 9/1976 | Leupp et al. |
| 4,653,864 A | 3/1987 | Baron et al. |
| 4,775,225 A | 10/1988 | Tsuboyama et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,539,545 A | 7/1996 | Shimizu et al. |
| 5,548,429 A | 8/1996 | Tsujita |
| 5,680,189 A | 10/1997 | Shimizu et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,952,678 A | 9/1999 | Ashida |
| 5,956,112 A | 9/1999 | Fujimori et al. |
| 6,001,203 A | 12/1999 | Yamada et al. |
| 6,016,181 A | 1/2000 | Shimada |
| 6,219,126 B1 | 4/2001 | Von Gutfeld |
| 6,236,445 B1 | 5/2001 | Foschaar et al. |
| 6,246,074 B1 * | 6/2001 | Kim et al. ..................... 257/48 |
| 6,337,730 B1 | 1/2002 | Ozaki et al. |
| 6,613,650 B1 * | 9/2003 | Holmberg ................... 438/438 |
| 6,639,646 B2 * | 10/2003 | Lim ............................ 349/187 |

FOREIGN PATENT DOCUMENTS

| JP | 57038414 | 3/1982 |
| JP | 57088428 | 6/1982 |
| JP | 58027126 | 2/1983 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |

(List continued on next page.)

Primary Examiner—Toan Ton
Assistant Examiner—Tai Duong
(74) Attorney, Agent, or Firm—McKenna Long & Aldridge LLP

(57) ABSTRACT

A composite liquid crystal that interacts with an inspection station to simulate operating liquid crystal displays, and methods of fabricating and testing such liquid crystal panels. The composite liquid crystal panel enables the application of operating voltages to a plurality of unit liquid crystal panel areas. The inspection station provides operating power, illuminating light, and first and second polarizers. When power is applied to the composite liquid crystal panel an image is produced. That image will show defects in the unit liquid crystal panel areas. Beneficially, the inspection station tilts to enable problem identification.

3 Claims, 8 Drawing Sheets

FOREIGN PATENT DOCUMENTS

| | | |
|---|---|---|
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 05265011 | 10/1993 |
| JP | 05281557 | 10/1993 |
| JP | 05281562 | 10/1993 |
| JP | 06051256 | 2/1994 |
| JP | 06148657 | 5/1994 |
| JP | 6160871 | 6/1994 |
| JP | 06265915 | 9/1994 |
| JP | 07128674 | 5/1995 |
| JP | 07181507 | 7/1995 |
| JP | 08095066 | 4/1996 |
| JP | 08106101 | 4/1996 |
| JP | 08171094 | 7/1996 |
| JP | 08190099 | 7/1996 |
| JP | 08240807 | 9/1996 |
| JP | 09005762 | 1/1997 |
| JP | 09026578 | 1/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10221700 | 8/1998 |
| JP | 10282512 | 10/1998 |
| JP | 11014953 | 1/1999 |
| JP | 11038424 | 2/1999 |
| JP | 11064811 | 3/1999 |
| JP | 11109388 | 4/1999 |
| JP | 11174477 | 7/1999 |
| JP | 11212045 | 8/1999 |
| JP | 11344714 | 12/1999 |
| JP | 2000029035 | 1/2000 |
| JP | 2001117105 | 4/2001 |
| JP | 2001133794 | 5/2001 |
| JP | 2001142074 | 5/2001 |
| JP | 2001147437 | 5/2001 |
| JP | 2001154211 | 6/2001 |
| JP | 2001255542 | 9/2001 |
| JP | 2001264782 | 9/2001 |
| JP | 2001330840 | 11/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |
| JP | 2002090759 | 3/2002 |
| JP | 2002090760 | 3/2002 |
| JP | 2002107740 | 4/2002 |
| JP | 2002122872 | 4/2002 |
| JP | 2002122873 | 4/2002 |
| JP | 2002080321 | 6/2002 |
| JP | 2002202512 | 7/2002 |
| JP | 2002202514 | 7/2002 |
| JP | 2002214626 | 7/2002 |

* cited by examiner

LIQUID CRYSTAL PANEL, APPARATUS FOR INSPECTING THE SAME, AND METHOD OF FABRICATING LIQUID CRYSTAL DISPLAY THEREOF

This application claims the benefit of Korean Patent Applications P2002-10197 and P2002-13527, which were respectively filed on Feb. 26, 2002 and Mar. 13, 2002, and which are hereby incorporated by reference.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10,184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to liquid crystal display panels. In particular, the present invention relates methods of fabricating and inspecting such panels.

2. Discussion of the Related Art

Following the expansion of the information society, a need has arisen for displays that produce high quality images in thin, lightweight packages that consume little power. To meet such needs, research has produced a variety of flat panel display devices, including liquid crystal displays (LCD), plasma displays (PDP), electro luminescent displays (ELD), and vacuum fluorescent displays (VFD). Some of these display technologies have already been applied in information displays.

Of the various types of flat panel display devices, the LCD is probably the most widely used. In fact, in portable devices, such as notebook PC computers, LCD technology has already replaced cathode ray tubes (CRT) as the display of choice. Moreover, even in desktop PCs and in TV monitors, LCDs devices are becoming more common.

The basic LCD is comprised of opposing substrates and a liquid crystal material that is disposed between the substrates.

Liquid crystal is a material phase that has properties between liquid and solid. Liquid crystal has the fluidity of a liquid, but has the long-range crystal ordering of a solid. Liquid crystal has optical anisotropy due to its long-range crystal ordering and fluidity.

An LCD is manufactured using a number of processes, including array formation, color filter (CF) formation, liquid crystal filling (disposing), and module forming (described subsequently).

Array formation involves depositions, photolithography, and etching to form a thin film transistor (TFT) array on a first substrate (the TFT substrate). Color filter (CF) formation includes forming red, green, and blue color filters in a black matrix, and forming an ITO (Indium Tin Oxide) film that acts as a common electrode on a CF substrate.

The liquid crystal filling (disposing) process involves assembling the TFT substrate and the CF substrate together. Generally, the TFT and color filter substrates are mated to produce a thin gap between substrates. Then, liquid crystal is filled through a gap opening to form a liquid crystal panel.

In module forming a driving circuit for processing input and output signals is connected to the liquid crystal panel. Additionally, frames are added to complete the liquid crystal module.

LCDs are typically assembled on a production line. In the prior art, cassettes, each having a plurality of TFT substrates or a plurality of color filter substrates, are input to a loader. Each TFT substrate includes a plurality of gate lines that extend in one direction, and a plurality of perpendicularly crossing data lines. Thin film transistors and pixel electrodes are arranged in a matrix at areas between the gate and data lines. The CF substrates each have a black matrix layer, a color filter, and a common electrode. Hence, the black matrix layer shields light leakage except for that desired from the pixel region.

Each TFT substrate or color filter substrate is individually removed from the cassette by the loader and transferred to the input of an alignment layer production line. That line, which includes a hand-programmed robot, forms an alignment layer on the individual substrates, reference alignment process step 1S of FIG. 1.

Step 1S includes cleaning individual substrates to enable formation of a uniform alignment layer coating. Then, an alignment material is coated on the substrate. Then, the alignment material is cured by drying off a solvent in the alignment material, and/or by inducing thermal polymerization of the alignment material. After curing, the alignment material is mechanically rubbed to induce a surface that anchors the liquid crystal in a uniformly align fashion. Finally, a cleaning process is carried out again, resulting in an alignment layer.

After the alignment layer 1S is completed, several processes are performed to produce a gap. Those processes can be carried out in serial or in parallel. The gap forming processes include a cleaning process (step 2S) in which a substrate (TFT or color filter substrate) is cleaned and a spacer scattering process (step 3S) in which spacers are scattered onto that substrate. The spacers are used to maintain the gap thickness constant and uniform.

Instead of forming a gap, a sealant coating process (step 4S) can be performed on the substrate (one type of substrate [TFT or CF] undergoes gap forming, the other undergoes sealant coating). After a cleaning step 2S, a sealing material is disposed on a peripheral part of the substrate. The sealing material is subsequently used to attach the TFT substrate to the CF substrate to form an assembled panel. It should be understood that the sealant coating process (4S) is performed on one type of substrate (TFT or CF), while spacer scattering is performed on the other type. Thus, as shown in FIG. 1, the production line has two sub-portions. One sub-portion cleans (step 2S) and scatters spacers (step 3S). The other cleans (step 2S) and produces a seal (step 4S).

After the spacer scattering process 3S and the sealant coating process 4S, an assembling process (5S) that aligns, heats, and presses the TFT substrate and the color filter substrate together to produce an LCD panel is performed. In the assembly process, the TFT substrate and the color filter substrate are arranged in an opposing fashion and then joined to form an LCD panel.

After the assembly process (step 5S), a cutting process (step 6S) cuts the assembled empty LCD panel into a plurality of unit panels by scribing and breaking the assembled empty panel.

After the cutting process (step 6S) is complete, liquid crystal is filled into the unit panels through a liquid crystal filling hole in the sealing material and the filling hole is then sealed (step 7S).

Finally, after step 7S, the individual liquid crystal unit panels are ground (to removed cutting burrs), and inspected, reference step 8S. The liquid crystal cell is then complete.

A typical prior art liquid crystal injection process per step 7S is schematically illustrated in FIG. 2. As shown, liquid crystal 25 is put into a vessel 30. The vessel 30 is inserted in a vacuum chamber 20. The vacuum chamber 20 is evacuated for a period of time to remove water adhering to an inner wall of the vessel 30, water in the liquid crystal 25, and micro bubbles in the liquid crystal 25.

Still referring to FIG. 2, the seal opening of several unit panels 40 are then dipped into the liquid crystal. Inflowing $N_2$ gas produces atmospheric pressure in the chamber 20. The pressure difference between the vacuum in the unit panels 40 and the chamber 20 forces liquid crystal into the unit panels.

After the respective unit panels 40 have been charged with liquid crystal 20, the liquid crystal inlet is sealed. The unit liquid crystal panels are then cleaned. This completes step 7S.

While beneficial, liquid crystal injection using the foregoing procedures has problems. For example, liquid crystal injection method requires a long time, such as over 10 hours to fill a ten-inch panel. The injection time is so long because the gap thickness between the substrates is very small and the area to be filled is relatively large. This problem is particularly acute when fabricating a large area LCD. Additionally, the foregoing process wastes liquid crystal due to the fact that excess liquid crystal material cannot be reused because the liquid crystal may be contaminated and/or degraded by impurities and chemical reactions. To overcome such problems a method of applying liquid crystal using a dropping method has been proposed.

The liquid crystal dropping method is briefly explained with reference to FIG. 3. It should be understood that the TFT and color filter substrates are beneficially large glass substrates that include a plurality of substrate panel areas (TFT arrays and color filter arrays) that will eventually form individual LCD displays. In the liquid crystal dropping method, liquid crystal is dropped onto substrate panel areas of a substrate. The dropped liquid crystal will be subsequently spread over the substrate panel areas when the first and second substrates are assembled together.

Referring now to FIG. 3, an alignment process 100s is carried out as described above to give the liquid crystals uniform directivity. Then, referring to step 102S, the TFT and CF substrates are cleaned.

Subsequently, in step 103S, the cleaned CF substrate is loaded on a seal dispenser and a seal is dispensed around the circumference of the respective substrate panel areas. The sealant is beneficially a photo/thermo-hardened resin. Notably, a liquid crystal injection inlet/opening is unnecessary.

Meanwhile, in step 105S, the cleaned TFT substrate is loaded on an Ag dispensing equipment to form Ag dots on a common electrode supply line of the TFT substrate. Then, in step 106S, the TFT substrate is loaded on an LC dispenser. Then, liquid crystal is dropped on the substrate panel areas.

Subsequently, in a vacuum assembly and hardening step 107S, the TFT and CF substrates are loaded in a vacuum chamber. Then, the TFT and CF substrates are assembled to each other such that the dropped liquid crystals uniformly fill the gap between the substrate panel areas. The sealant is then hardened to form a composite LC panel. The composite LC panel is a large panel having a plurality of unit liquid crystal panel areas.

In an S/B (scribe/break) step 108S the composite LC panel is divided into individual LC panels. The S/B step 108S includes a scribing process in which cutting lines are formed on the glass surface using a diamond-based pen, and a breaking process that separates the individual LC panels by applying a force.

A grinding step S109 grinds faces of the individual LC panels to remove shorting bars. Then, an appearance and A/P (auto/probe) inspection step 110S is performed on each of the individual LC panels, completing the LC display formation process.

The A/P inspection is an electrical inspection of the individual LC panels that uses a device that applies a predetermined voltage to input terminals that are connected to the gate and data lines of the TFT substrate of the unit LC panel. The A/P inspection is useful in checking cell gap failures or LC leakage failures.

After step 110S, a module is formed by integrating a driver IC, a backlight, and module frames to the individual LC panel.

Unfortunately, the liquid crystal dropping method has problems of its own. For example, after the composite LC panel has been cut into individual LC panels, the appearance and electrical integrity are checked by a worker. That testing was relatively difficult and time consuming to perform since the drive lines of the all of the individual LC panels had to be driven with a predetermined pattern to test the individual LC panel. This increase inspection time and leads to worker fatigue.

Therefore, a method of automatically checking the electrical integrity and visual performance of a composite LC display would be beneficial. Even more beneficial would be a method of automatically checking the electrical integrity and visual performance of a composite LC display that did not overly tax workers or significantly impact on productivity.

SUMMARY OF THE INVENTION

Accordingly, the present invention is directed to a composite liquid crystal panel, to an apparatus for inspecting the same, and to a method of fabricating an individual liquid crystal panels in a manner that substantially obviates one or more problems due to limitations and disadvantages of the related art.

An advantage of the present invention is to provide a composite liquid crystal panel having an electrode structure that enables electrical and visual inspection of the composite large liquid crystal panel. Another object of the present invention is to provide for an apparatus that inspects composite liquid crystal panels having a special electrode structure. Yet another object of the present invention is to provide a method of fabricating a composite liquid crystal display having a special electrode structure such that the composite liquid crystal display can be divided into individual liquid crystal panels, beneficial such that less testing of the individual liquid crystal panels is required.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described herein, a liquid crystal panel according to the present invention includes a substrate having a plurality of substrate panels areas comprised of a plurality of perpendicularly crossing gate and data lines. Additionally, the substrate includes first and second metal lines that are respectively formed in the column and row directions and along edges of the substrate. A column-shorting bar that short-circuits a plurality of the gate lines is electrically connected to the second metal line. A row-shorting bar that short-circuits a plurality of the data lines is electrically connected to the first metal line.

In another aspect of the present invention, a method of fabricating a liquid crystal display includes preparing first and second substrates that, when bonded together, form a composite liquid crystal panel having a plurality of unit LC panel areas. The method further includes assembling the first and second substrates together by bonding, and then performing A/P testing that checks for electrical failures and visual defects of the composite liquid crystal panel.

In a further aspect of the present invention, fabricating a liquid crystal display includes the steps of preparing first and second substrates, each having a plurality of substrate panel areas, coating sealant around the substrate panel areas of one of the first and second substrates, dropping liquid crystals on the substrate panel areas of the other of the first and second substrates, forming a composite liquid crystal panel having a plurality of unit liquid crystal panel areas by bonding the first and second substrates together such that the substrate panel areas of the first and second substrates are opposed, carrying out A/P (auto probe) testing to identify electrical failures and visual defects in the unit large liquid crystal panel area, cutting the composite liquid crystal panel to form a plurality of individual liquid crystal panels, and then grinding faces of the individual liquid crystal panels.

In another further aspect of the present invention, an inspection apparatus includes a stage having a rotational axis that enables stage tilting, a light source inside the stage that enables substantially uniform light irradiation, a first polarizer arranged over the light source and dimensioned to cover a composite liquid crystal panel that is to be tested, and at least two voltage terminals for applying a predetermined voltage to the composite liquid crystal panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to illustrated embodiments of the present invention, examples of which are shown in the accompanying drawings. Wherever appropriate, the same reference numbers will be used throughout the drawings to refer to the same or similar parts.

Figure 1:
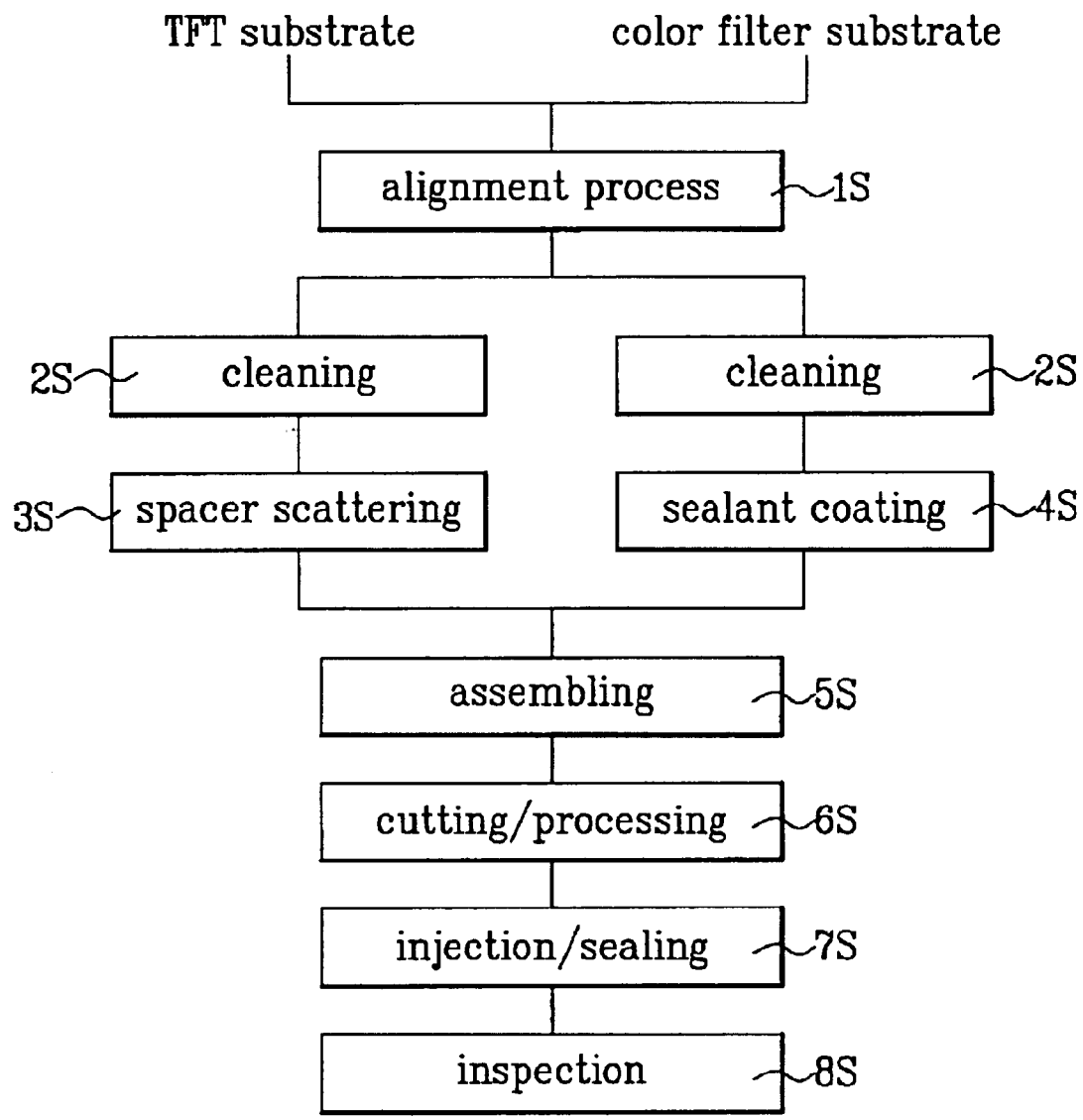
FIG. 1 illustrates a flowchart of LCD fabrication using vacuum injection.
Figure 2:
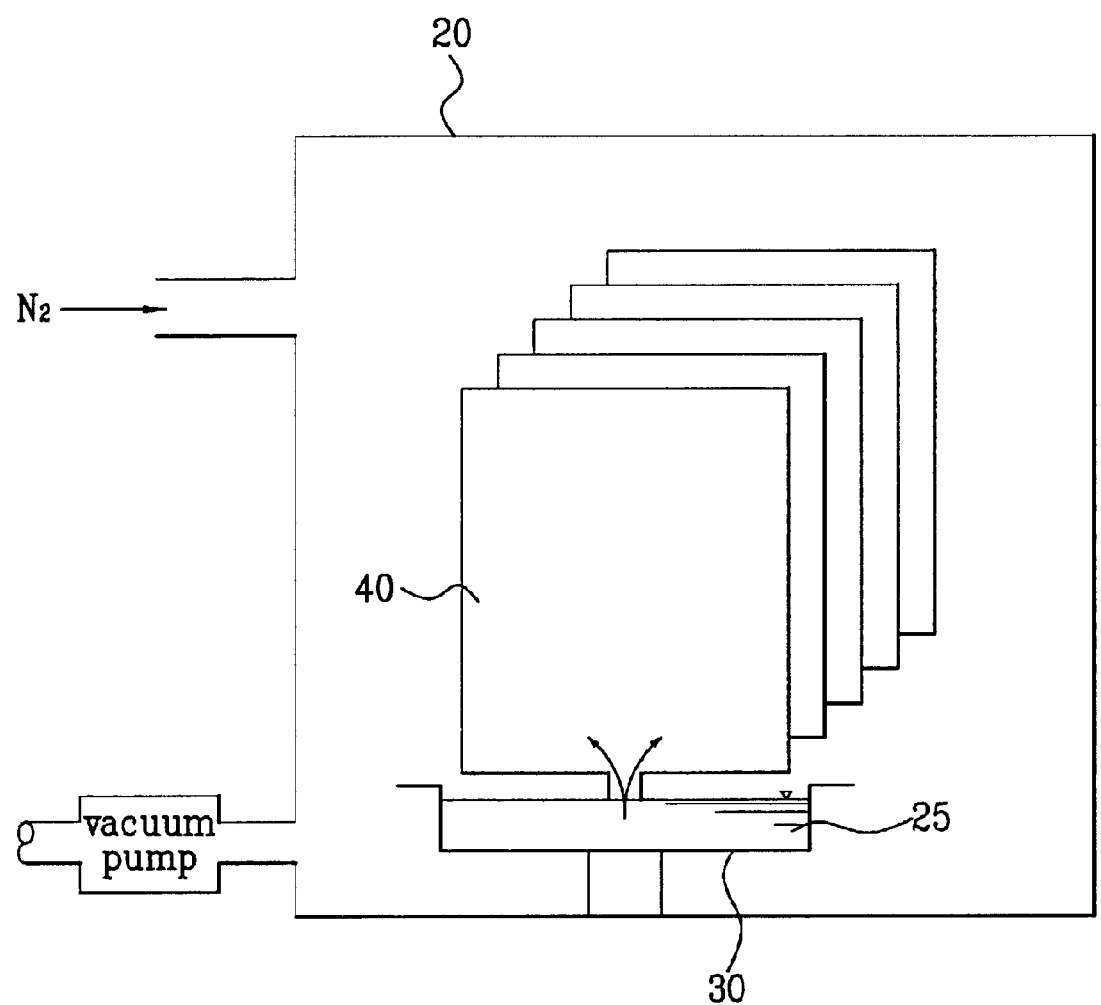
FIG. 2 illustrates vacuum injection as used in the flowchart of FIG. 1.
Figure 3:
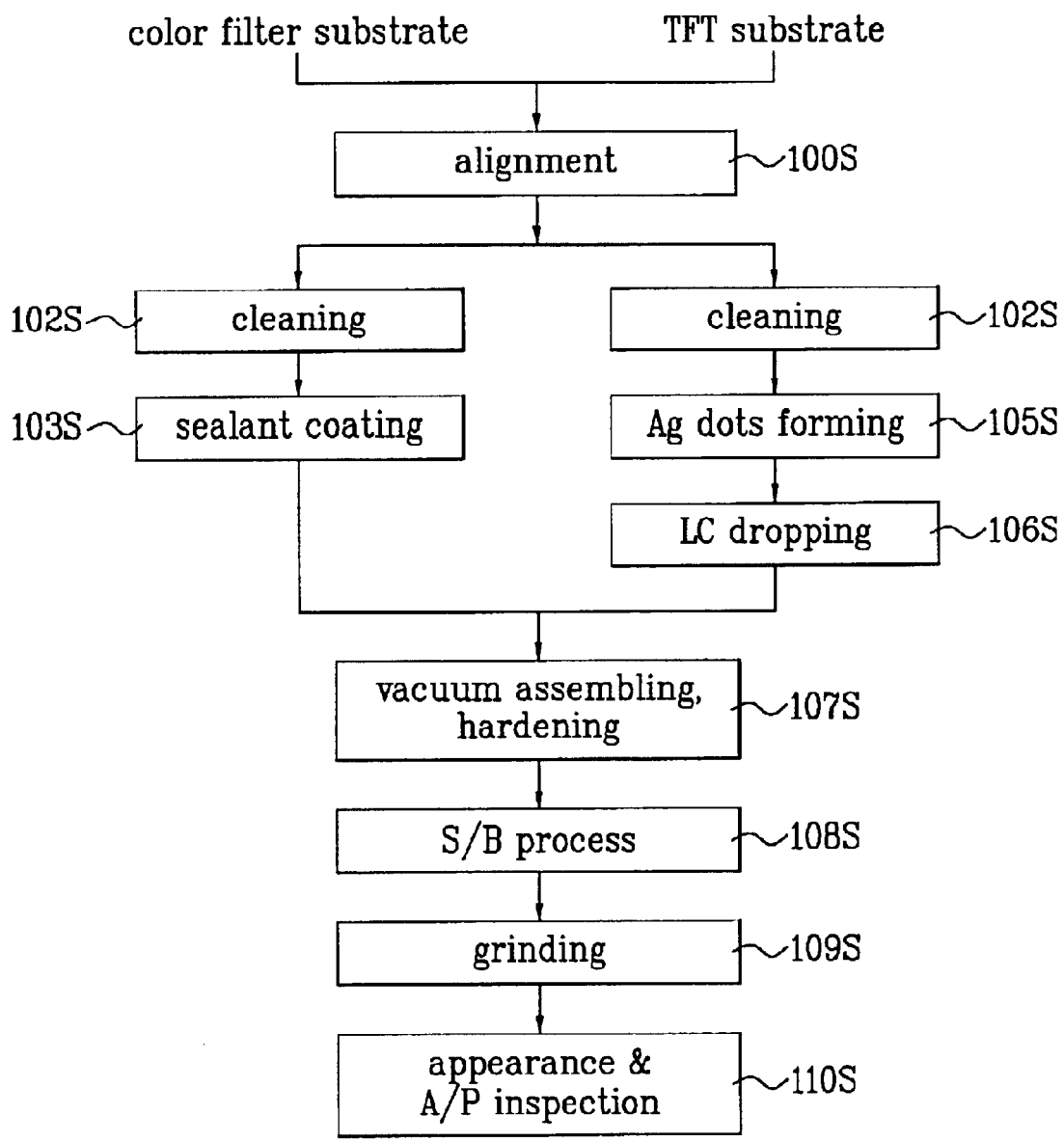
FIG. 3 illustrates a flowchart of LCD fabrication using applying (dropping) liquid crystal to a substrate.
Figure 4:
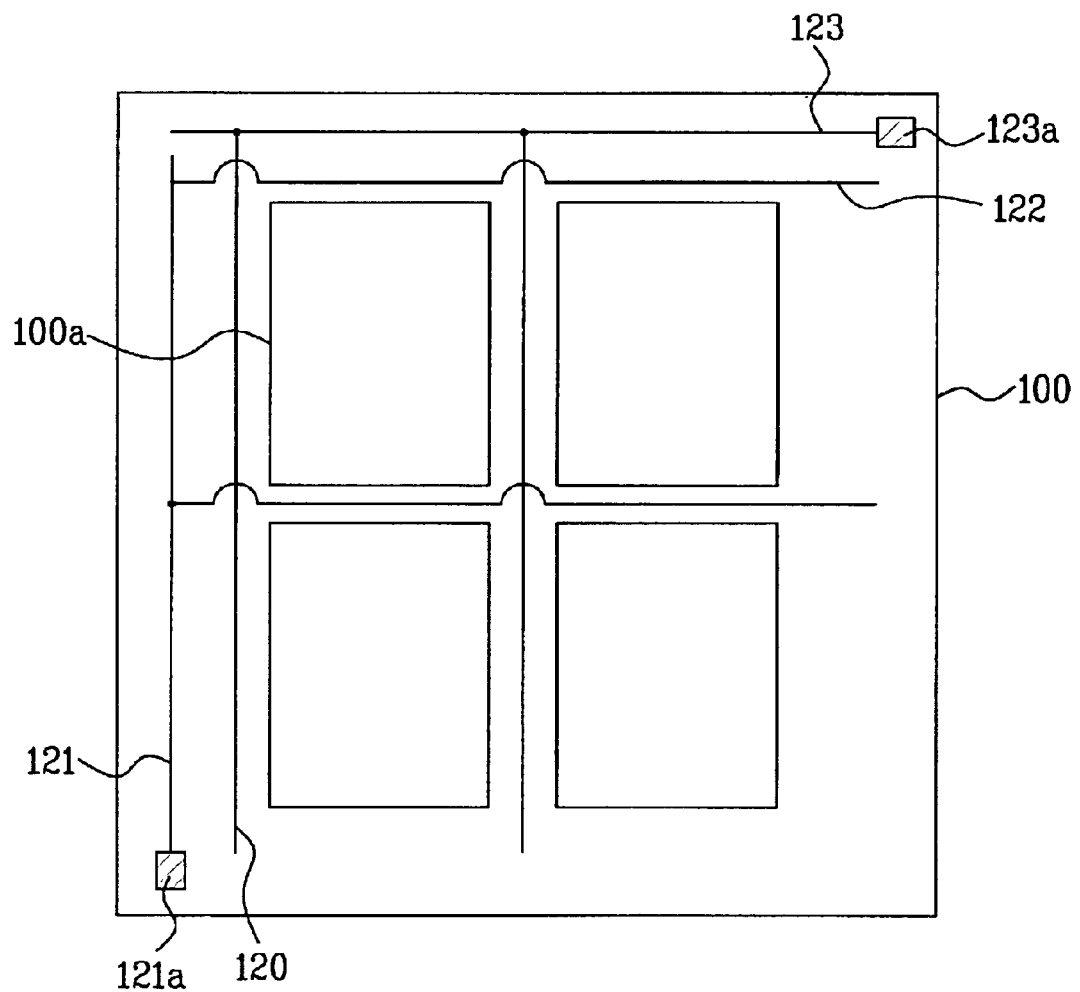
FIG. 4 schematically illustrates a first substrate of an LC panel according to an embodiment of the present invention.
Figure 5:
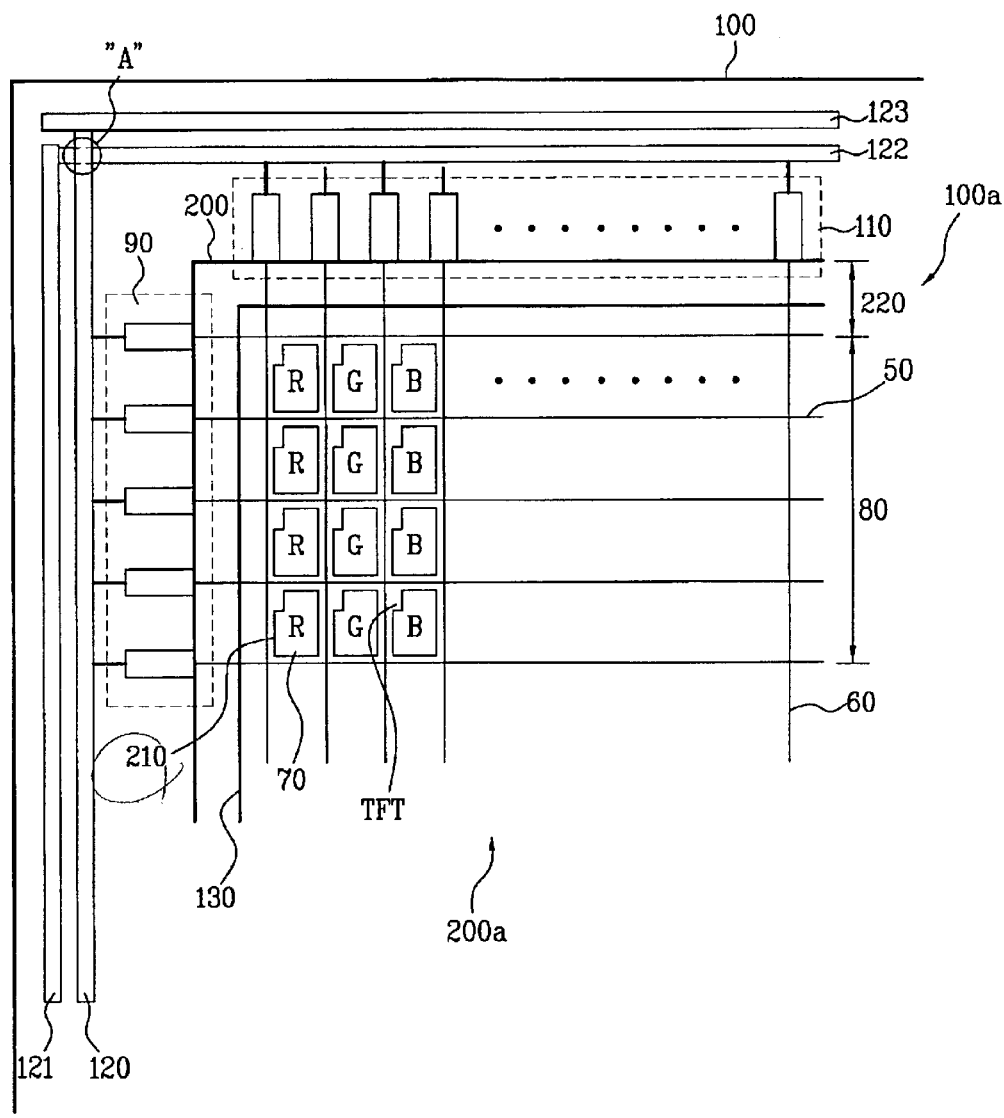
FIG. 5 schematically illustrates an LC panel according to an embodiment of the present invention.
Figure 6:
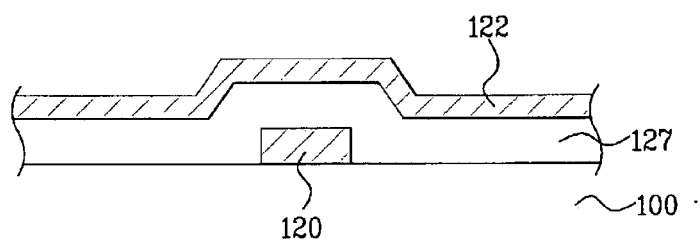
FIG. 6 illustrates a magnified cross-sectional view of portion 'A' in FIG. 5.
Figure 7:
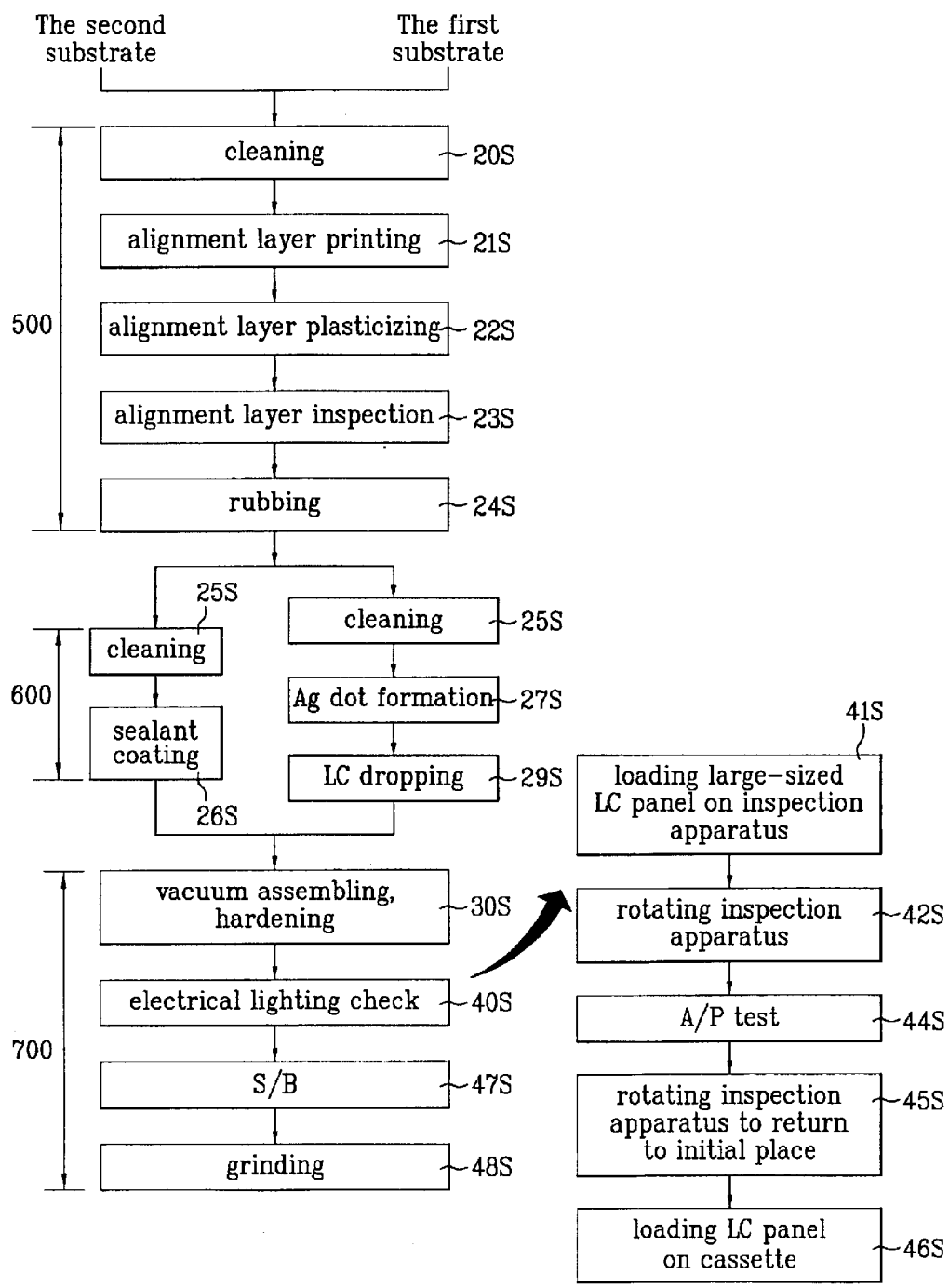
FIG. 7 illustrates a flowchart of an LCD fabrication method according to an embodiment of the present invention.
Figure 8:
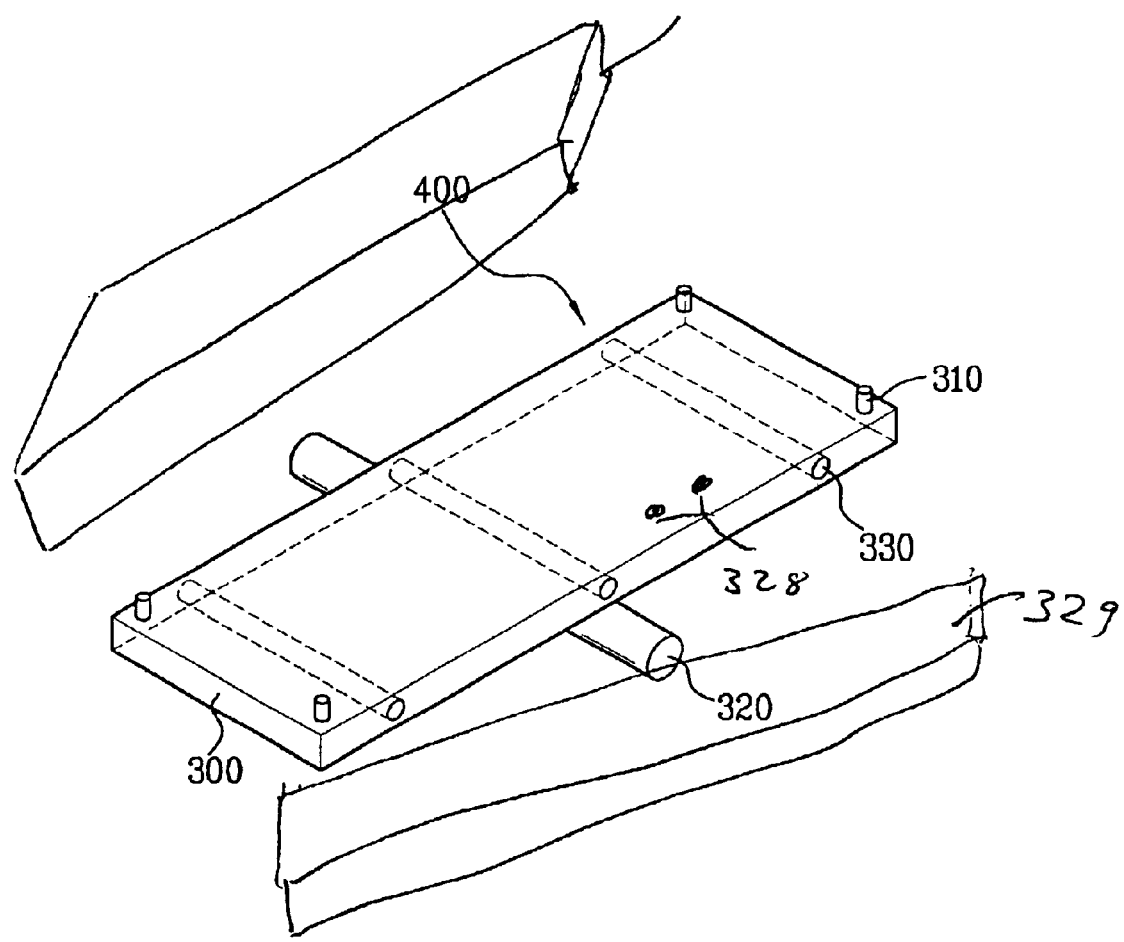
FIG. 8 illustrates an inspection apparatus according to an embodiment of the present invention.
Figure 9:
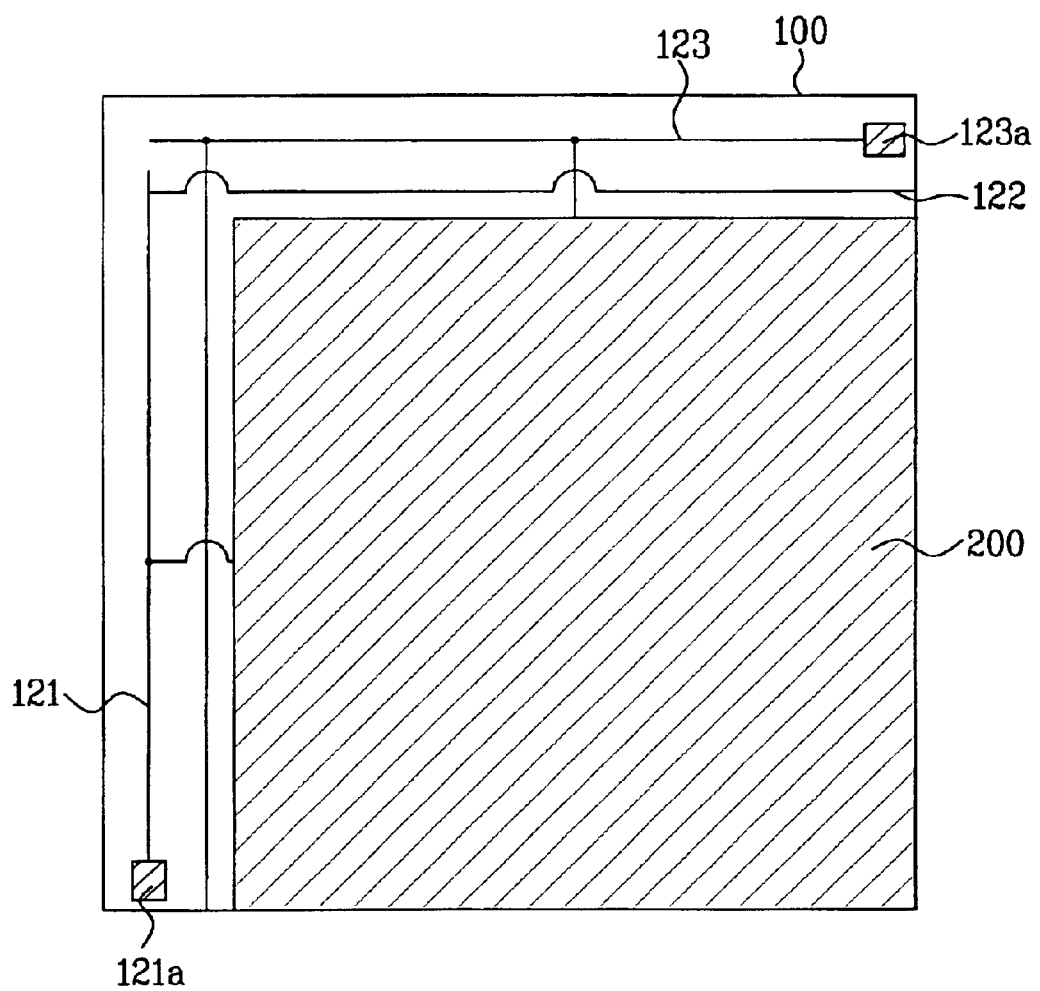
FIG. 9 schematically illustrates a structural layout of an LC panel according to an embodiment of the present invention.

FIG. 4 schematically illustrates a first substrate of an LC panel according to an embodiment of the present invention, FIG. 5 schematically illustrates an unit LC panel area according to an embodiment of the present invention, FIG. 6 illustrates a magnified cross-sectional view of portion 'A' of FIG. 5, FIG. 7 illustrates a flowchart of an LCD fabrication method according to an embodiment of the present invention, FIG. 8 illustrates an inspection apparatus according to an embodiment of the present invention, and FIG. 9 schematically illustrates a structural layout of a composite LC panel according to an embodiment of the present invention.

Refer to FIG. 4 and FIG. 5 for illustrations of first and second substrates 100 and 200, respectively a TFT array substrate and a color filter array substrate. The first substrate 100 includes a plurality of first substrate panel areas 100a, while the second substrate 200 includes a matching set of second substrate panel areas. Completed first and second substrates 100 and 200 are loaded on cassettes that enter an LC (liquid crystal) fabrication line.

The first substrate panel areas 100a each include a plurality of gate lines 50 that are arranged in one direction with a predetermined interval, and a plurality of data lines 60 are arranged in a perpendicular direction and with a predetermined interval. Matrix type pixel areas 70 are defined by the gate and data lines 50 and 60. A plurality of thin film transistors TFT and pixel electrodes are formed in the pixel areas 70. An image display area 80 is constructed from a plurality of the pixel areas 70. Moreover, while not shown in the drawings, a gate electrode of each of the thin film transistors TFT is connected to a corresponding gate line 50, while a source electrode is connected to a corresponding data line 60. A drain electrode of each of the thin film transistors is connected to the pixel electrode in the pixel area 70. Moreover, a plurality of the gate and data lines 50 and 60 are connected to gate and data pads 90 and 110 that are disposed along the circumference of the TFT unit substrate area 100a.

Additionally, first and second metal lines 121 and 123 are formed in the column and row directions near edges of the first substrate 100. External terminals 121a and 123a are formed at ends of the first and second metal lines 121 and 123. The first and second metal lines 121 and 123 are conductive lines that will be used for testing the composite liquid crystal panel during A/P testing. The first and second metal lines 121 and 123 are eventually discarded.

A column shorting bar 120 and a row shorting bar 122 for each substrate panel area electrically shorts the ends of the gate and data lines 50 and 60 by connecting to the pads 90 and 110 respectively. The row shorting bars 122 are electrically connected to the first metal line 121, while the column shorting bars 120 are electrically connected to the second metal line 123. As a result, all of the gate lines 50 of all of the first substrate panel areas 100a are tied together, and all of the data lines 60 of all of the first substrate panel areas 100a are tied together. It should be noted that static electricity produced at any gate or data pad 90 and 110 is discharged into all of the first substrate panel areas 100a by the shorting bars.

Referring specifically to FIG. 5, a plurality of second substrate areas 200a are formed on the second substrate 200. The second substrate areas 200a each include a black matrix layer 210 that prevents light from passing through the second substrate area 200a, except in the pixel areas 70. They also include a color filter layer for three primary colors, a common electrode along an entire face of the second substrate, and a column type spacer (advantageous for a large LCD). The column type spacer is formed to correspond to the gate and data lines on the first substrate 100.

A black circumference part 220 is installed so as to block unnecessary light from the external surroundings of a display part 80. The first and second substrates 100 and 200 having the first and second substrate areas 100a and 200a are assembled to each other using a sealant 130 made of a photo-hardened or thermo-hardened resin.

FIG. 6 illustrates a magnified cross-sectional view of the portion 'A' of FIG. 5. As shown, an insulating layer 127 is inserted between the column and row shorting bars 120 and 122 on the first substrate 100 so as to isolate the column and row shorting bars 120 and 122 from each other.

The above-constructed first and second substrates 100 and 200 are fabricated into an individual LC panels using the processing flowchart of FIG. 7. As shown, the first and second substrates are transferred, by a loader, into an LC cell processing station. The LC cell processing station performs three main steps, the steps 500, 600, and 700.

The first step 500 is an alignment process for imparting uniform directivity to the liquid crystals. The alignment process is carried out by substrate cleaning 20S, followed by alignment layer printing 21S, then alignment layer plasticizing 22S, followed by alignment layer inspecting 23S, and finally alignment layer rubbing 24S.

Several comments about the step 500 may be helpful. After the cleaning process 20S remove particles the substrate is ready for printing. An alignment material solution is dropped between Doctor and Anilox rolls that rotate in a dispenser. The alignment layer liquid is maintained as a liquid film on the face of the Anilox roll and is transferred to a print roll having a print rubber plate. A film of the alignment material solution is then coated on the first and second substrates by transcription.

Subsequently, a baking process plasticizes the alignment layer, reference step 22S. Baking then evaporates a solvent in the alignment layer liquid. The alignment layer is then inspected (step 23S) and rubbed (step 24S).

The second step 600 is then performed. The substrate with the alignment layer is then cleaned (step 25S). If the substrate is a CF substrate, a sealant is coated around the second substrate panel areas, step 26S. Notably, the sealant has no injection inlet.

If the substrate is a TFT substrate, the substrate is also cleaned, step 25S, Then, Ag dots are formed to enable electrical connections to the common electrode of the CF substrate, step 27S. Liquid crystals are then applied to the first substrate panel areas at locations that correspond to being inside the sealant on the color filter substrate. Beneficially, the liquid crystal is applied by dropping droplets, step 29S.

Liquid crystal dropping is performed by removing bubbles from liquid crystals using vacuum, loading an LC dropping device on an LC dispensing equipment, loading the first substrate on the LC dispensing equipment, and dropping liquid crystals on the first substrate using the LC dropping device.

While the foregoing has discussed forming a seal on the CF substrate and dropping liquid crystal on the TFT substrate, in practice, seals could be formed on TFT substrates and liquid crystal could be dropped on the CF substrate.

After step 600, the third step 700 is performed. The first and second substrates are assembled to each other in a vacuum assembling equipment such that the first and second substrate panel areas are opposed. Then UV-rays are irradiated onto the sealant to harden the sealant, thus forming a composite LC panel.

While not shown in the figures, the assembling process is performed as follows. First, the first substrate is mounted on a table in a vacuum vessel that enables movement in a horizontal direction, beneficially, using a first suction device. Then, the second substrate is affixed by vacuum suction to second suction devices such that the second substrate is over the first. The vacuum chamber is then closed and a vacuum is formed. The second suction device then descends so as to leave a predetermined interval between the first and second substrates. The first substrate is then moved horizontally to align with the second substrate.

Subsequently, the second suction device descends such that the second substrate is assembled to the first substrate via the sealant. The first and second substrates are then pressed together such that the liquid crystal unit panel areas are filled with the liquid crystals (which spread across the first substrate liquid crystal unit panel areas). Thus, a large LC panel having a plurality of liquid crystal unit panel areas is fabricated. Thereafter, the panel is taken out of the vacuum chamber, and is irradiated by UV light so as to cure the sealing material.

An electrical lighting inspection is then performed, reference step 40S. The electrical lighting inspection is carried out as follows. Referring now to FIGS. 7 and 8, the large LC panel is loaded on an inspection equipment 400 by a robot arm, reference step 41S. The inspection equipment 400, as shown in FIG. 8, includes a stage 300, at least three protrusions 310 arranged so as to have a minimum contact area between the stage 300 and the composite LC panel put on by the robot arm, a rotational member 320 that tilts, and light sources 330 within the stage 300. The light sources 330 radiate light uniformly from inside the stage. A first polarizer 327 is arranged over the light source 330. A fixing part (not shown in the drawing) fixes the 1 composite LC panel to the stage 300 when the stage rotates.

The inspection equipment 400 further includes at least two voltage terminals 328 for applying a voltage to external connection terminals 121a and 123a, reference FIG. 4, which enable the application of electric power to the gate and data pads 90 and 110, reference FIG. 5.

Referring now to FIG. 8, the inspection equipment 400 rotates at predetermined angles by way of the rotational member 320 after the composite LC panel is loaded on the inspection equipment 400 by the robot arm, reference steps 41S and 42S. The composite LC panel receives external power via the external connection terminals 328.

Next, a user performs A/P testing using a second polarizer 329 having a predetermined size that is coupled with the inspection equipment such that the first and second polarizers sandwich the composite LC panel, reference step 44S.

FIG. 9 illustrates the layout of the composite LC panel according to an embodiment of the present invention. As shown, an external voltage is applied via external connection terminals 328 to the terminal 121a, connected to the first metal line 123, and to the external connection terminal 123a, connected to the second metal line 123. Also, a predetermined DC voltage is applied to the common electrode of the second substrate 500. This enables the A/P (auto probe) testing, reference step 44S of FIG. 7.

The inspection equipment 400 with a composite LC panel sandwiched between the first and second polarizers, together with the light from the light sources 330 and the applied electrical power simulate an operating LC display module that produces a solid image. Electrical defects, such as open or shorted gate and data lines, will be visually apparent since areas will be blank (or have other distortions). Furthermore, image stains such as cross-striped areas, black regions, color filter protrusions, oblique stains, rubbing stripes, pin holes, open or shorted gate and data lines, and the like will be visible to human observers or to CCD (charge coupled device).

After completion of A/P test, the inspection equipment 400 is rotated to return to its initial position, reference step 45S. The large LC panel is then loaded into a cassette using the robot arm, reference step 46S.

Beneficially, A/P test is performed in the processing assembly line, thereby preventing unnecessary delays and inconvenience.

Subsequently, a S/B (scribe/break) process is carried out, reference step 47S. The S/B process includes a scribe step of forming cutting line on glass surfaces using a diamond-based pen, and a break step of cutting the glass by applying a force. The S/B process divides the large LC panel into a plurality of unit LC panels called cell units.

Then, a grinding process, step 48S is performed to grind faces of the unit LC panels, thereby completing the third step 700.

Thereafter, a module process that attaches a driver IC, a backlight, and the like is carried out.

Accordingly, the method of fabricating a liquid crystal display according to the present invention has the following advantages.

First, the electrode structure enables performing electrical and visual inspection of composite LC panels before the individual LC panels are completed. This enables a single inspection that reduces inspection time and worker fatigue. Furthermore, the present invention performs A/P testing in an early fabrication stage, thereby enabling feedback of defect information, which improves mass production.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A liquid crystal panel comprising:

a substrate having a plurality of panel areas, each panel area having a plurality of crossing gate and data lines;

a first metal line extending in a column direction along an edge of the substrate;

a second metal line extending in a row direction along an edge of the substrate;

a column shorting bar short-circuiting a plurality of the gate lines and electrically connected to the second metal line; and a row shorting bar short-circuiting a plurality of the data lines and electrically connected to the first metal line.

2. The liquid crystal panel of claim 1, further comprising connection terminals at ends of the first and second metal lines.

3. The liquid crystal panel of claim 1, further including an insulating layer between the row and column shorting bars.

* * * * *